United States Patent [19]

Bourdel

[11] 4,069,421
[45] Jan. 17, 1978

[54] DEVICE FOR LOCALIZING LIGHT PHENOMENA

[75] Inventor: Jacques Bourdel, St-Martin d'Uriage, France

[73] Assignee: Commissariat a l'Energie Atomique, Paris, France

[21] Appl. No.: 666,450

[22] Filed: Mar. 12, 1976

[30] Foreign Application Priority Data

Mar. 18, 1975 France .................................. 75 08451

[51] Int. Cl.² .............................................. G01T 1/20
[52] U.S. Cl. .................... 250/363 S; 250/368; 250/370
[58] Field of Search ............ 250/330, 332, 363, 363 S, 250/368, 361, 362, 370; 313/94, 98; 252/300 R, 300 UO; 156/99, 106

[56] References Cited

U.S. PATENT DOCUMENTS

| | | | |
|---|---|---|---|
| 2,667,599 | 1/1954 | Rajchman | 313/98 X |
| 3,073,954 | 1/1963 | Carlson et al. | 260/368 |
| 3,209,201 | 9/1965 | Anger | 250/363 S X |
| 3,793,519 | 2/1974 | Mallard et al. | 250/368 X |
| 3,971,942 | 7/1976 | Seidman et al. | 250/363 S |

*Primary Examiner*—Archie R. Borchelt
*Attorney, Agent, or Firm*—McNenny, Pearne, Gordon, Gail, Dickinson & Schiller

[57] ABSTRACT

The device comprises a photocathode for converting light phenomena to photoelectrons, means for focusing the photoelectrons emitted by the photocathode in the form of a large number of separate beams each corresponding to the photoelectrons emitted by a well-localized fraction of the photocathode, and means for detecting and localizing the beams of photoelectrons in a surface which is secant therewith.

15 Claims, 13 Drawing Figures

DEVICE FOR LOCALIZING LIGHT PHENOMENA

This invention relates to a device for localizing light phenomena which are preferably produced by radiations.

More precisely, the present invention is concerned with a scintillation camera for localizing energy radiations such as X- or γ-rays, fast and thermal neutrons, protons, α- and β-radiations.

In general terms, consideration is given to a device which makes it possible to obtain an "image" of radiation emitted by a source, for example in order to reconstitute the shape of an emitting source which is observed through a collimator or to plot a diffraction diagram. In the case of scintillation cameras, the radiation is converted by means of a scintillator to visible light which is processed in order to determine the positions of the different points of the scintillator in which a light reaction has taken place.

This problem is encountered in many technical fields including, for example, physics, biology, medicine and certain industrial control processes. In these fields, the radiations emitted by one or a number of sources have to be localized geometrically. In the case of medicine, it proves necessary to localize the radiations emitted by an element into which a radioactive product has been injected.

A number of different types of scintillation cameras are at present in existence.

There can first be mentioned the Anger camera in which the light pulses produced by the scintillator are detected and localized by a set of photomultipliers located on the rear face of the scintillator with or without interposition of an optical medium. The signals delivered by the photomultipliers are combined electronically. The number of photomultipliers which are necessary is proportional to the surface area of the scintillator employed and to the square of the desired geometrical resolution. For example in the case of γ-radiations of 140 keV and of a sodium-iodide scintillator having a diameter of 260 mm, the geometrical resolution is 9 mm and nineteen photomultipliers are necessary. Should it be desired to improve the geometrical resolution and to increase the useful field, the number of photomultipliers rapidly becomes prohibitive. Moreover, this type of camera calls for frequent adjustments.

The case of brightness-amplifier cameras which produce an image reduction, for example as disclosed in French Pat. No. 2,056,586, is worthy of mention. The photoelectrons emitted by the photocathode associated with the scintillator are accelerated and focused on a screen by means of an optical-electronic system, thus reproducing to a smaller scale the electronic image emitted by the photocathode. The light emitted by a second brightness-amplification stage is localized by four photomultipliers.

The type of apparatus just mentioned entails the use of a curved scintillator; this scintillator is very cumbersome and the technology which has to be adopted in order to construct this latter is highly complex and costly. It has better resolution and stability than the Anger camera.

There can also be mentioned the channel-type image intensifier described in the American publication entitled "Advances in electronics and electron physics", vol XII, 1960, pages 135 to 152 (article by A. Roberts). In this case, intensification is obtained by means of dynodes with secondary electron emission. The disadvantages attached to a sytem of this type will be explained later.

The present invention is precisely directed to a device for localizing radiations which makes it possible to obtain appreciably higher geometrical resolution, a larger useful field, a higher count rate, better stability and smaller overall size than the devices of the prior art while being more readily adaptable to large-scale production.

The device for localizing light phenomena in accordance with the present invention essentially comprises:
- a photocathode which is capable of converting said light phenomena to photoelectrons,
- means for focusing in the form of a large number of separate beams the photoelectrons emitted by said photocathode, each beam being as to correspond to the photoelectrons emitted by a well-localized fraction of said photocathode, and
- means for detecting and localizing said beams of photoelectrons in a surface which is secant therewith.

The device also comprises means for accelerating said photoelectrons of said beams. In its application to the localization of radiations, the invention also makes provision before said photocathode for a scintillator which is capable of converting said radiations into light.

Preferably, the means for focusing said photoelectrons are constituted by a plurality of conductive grids which are parallel to each other and parallel to the photocathode, said grids being in spaced relation and brought to stepped electric potentials, each grid being provided with a plurality of openings which are all identical, the openings of said grids being so arranged as to constitute focusing channels having axes at right angles to said grids, said grids being placed between said photocathode and a first conductive plate pierced by a hole in the axis of each channel, said plate being parallel with said grids and brought to a positive potential with respect to the photocathode.

In a first embodiment, said grids are constituted by thin conductive sheets pierced by holes.

In a second embodiment, said grids are constituted by flat partitions parallel to the axis of said beams, said partitions being such as to delimit focusing channels which all have the same cross-section.

In this case, a set of partitions of the type aforesaid replaces at least one of said thin conductive sheets, or at least one set of sheets of this type or all the sheets aforesaid.

Preferably, the accelerating means are constituted by said first plate and by a second conductive plate brought to a strongly positive potential with respect to said first plate, said second plate being parallel to said first plate and pierced by a hole at the level of each hole of said first plate.

Moreover, the detecting means are preferably constituted by a plurality of electron-detecting semiconductor components disposed in the same plane at right angles to the axes of said channels, each component being located in the line of extension of one of the axes of said channels.

A more complete understanding of the invention will in any case be obtained from the following description of several embodiments of the invention which are given by way of example and not in any limiting sense, reference being made to the accompanying drawings, wherein.

Figure 1:
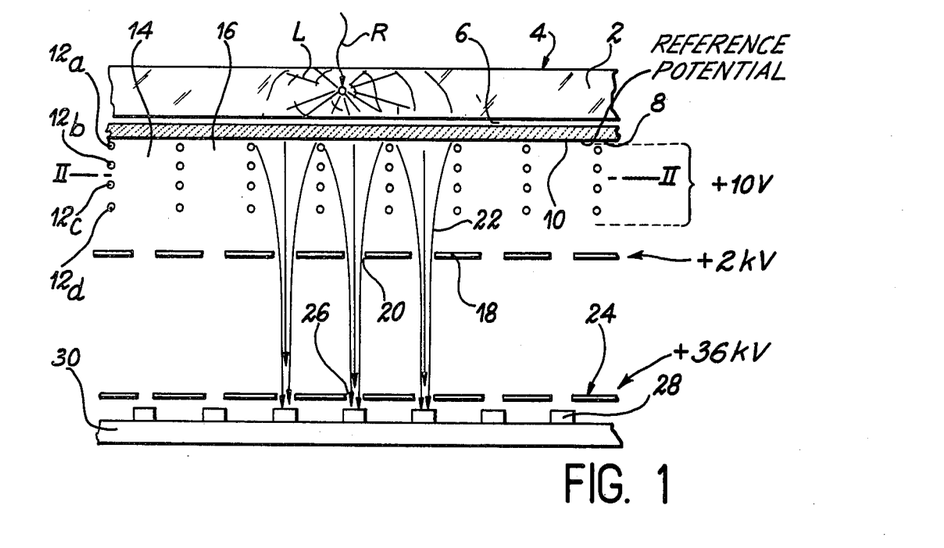
FIG. 1 is a vertical sectional view taken along the plane I—I of FIG. 2 and showing a first simplified embodiment of the device.
Figure 2:
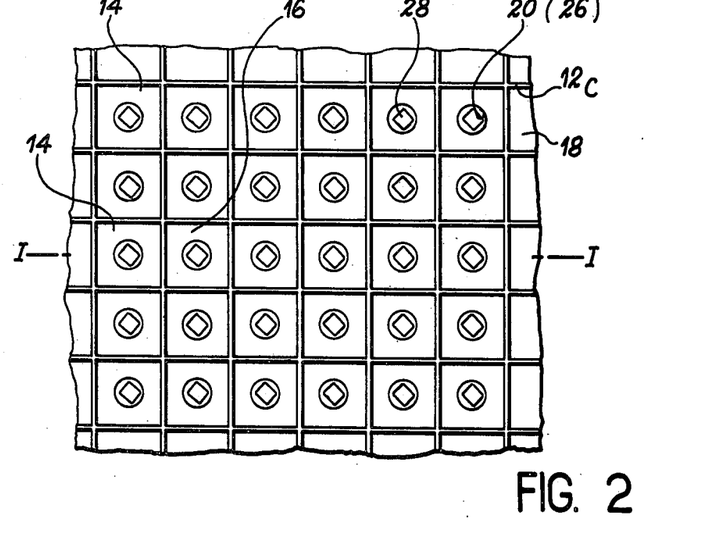
FIG. 2 is a horizontal sectional view taken along the plane II—II of FIG. 1 and showing the same device.

A first form of construction of the radiation-localizing device is shown diagrammatically in FIGS. 1 and 2.

The device first comprises a scintillator 2 of flat shape, the entrance face 4 of which receives the radiations to be localized.

The scintillator is formed of material which is capable of converting the radiation R into light which is represented schematically by the lines L.

A glass plate 8 which is optically coupled with said scintillator is placed on the rear face 6 of the scintillator. A special deposit 10 which performs the function of photocathode is formed on the rear face of the glass plate 8. It is recalled that the photocathode is a deposit constituted by materials which are capable of emitting electrons under the action of light radiation.

Provision is made behind the photocathode 10 for a plurality of focusing grids 12a, 12b, 12c and 12d pierced by holes which are parallel to each other and parallel to the photocathode 10. Said grids of very small thickness have a square pitch of length $l$. It is readily apparent that the elements of the grid could also be rectangular or hexagonal, for example. The grid 12c is shown in FIG. 2. Since they are in superposed and spaced relation, said grids define focusing channels 14, 16 and so forth, the axes of which are perpendicular to the plane of the photocathode.

The potentials to which said grids are brought and the diameters of the holes define the conditions of focusing of the electrons. By way of example, said potentials are of the order of + 10 V to − 10 V with respect to the photocathode.

The assembly for focusing the photoelectrons emitted by the photocathode is completed by a first conductive plate 18 which is parallel to the grids 12 and pierced by holes 20, each hole 20 being located in the line of extension of the axes of the focusing channels such as the channels 14 and 16. Said plate is brought to a positive potential with respect to the photocathode, said potential being of the order of 2 kV, for example. Focusing of the photoelectrons along the lines 22 is represented diagrammatically in FIG. 1. It is therefore observed that the assembly constituted by the grids 12 and the plate 18 defines a plurality of focusing channels for the photoelectrons emitted by that portion of the photocathode which corresponds to the channel.

It must be noted that the sole purpose of the grids 12 is focus each photoelectron beam emitted by the photocathode. Said grids do not in any event perform the function of multiplication by secondary emission of electrons. This makes it possible to overcome the major difficulty involved in controlling the gain of secondary emission dynodes: the statistical variations in gain of the secondary emission of the first dynodes would produce substantial variations in gain of each channel. Moreover, the mean gain from one channel to another is highly inhomogeneous.

Provision is made behind the first plate 18 for a second plate 24 which is parallel to the first and also provided with holes 26.

One hole per focusing channel is clearly provided in the axis of the holes 20.

The plates 18 and 24 serve at the same time as a screen for protecting the photocathode, the small columns and the detecting diodes against different unwanted phenomena such as the effect of backscattered electrons, electrons detached by field effect, ion bombardments and electromagnetic radiation emissions produced by the electrons. The plate 24 is brought to a positive potential which is substantially higher than that of the plate 18, for example of the order of 36 kV. An acceleration of the photoelectrons of each beam thus takes place between the two plates. Detecting diodes such as the diode 28 are placed behind the plate 24.

The screen function performed by the plate 24 can be explained as follows: the electrons which impinge upon the detectors such as 28 produce backscattered electrons which extend over an energy spectrum ranging from zero to the energy of the incident electrons and which are sent in all directions. When the screen 24 is not present, the electrons issuing from one of the detectors 28 are therefore sent into the adjacent channels in which they will produce parasitic signals having a strength such that the efficiency of the localization system is considerably impaired. On the contrary, if said screen is provided and the holes of this latter have a diameter which is similar to that of the detectors, the great majority of the electrons which are backscattered by a detector will be collected by the screen 24. Among the electrons which will have passed through the hole located opposite to said detector, only very few will be transferred to the adjacent channels and the majority will also be collected by the screen 24.

Since a diode is placed behind each hole 26, the diodes 28 are fixed on a support 30 on which are formed interconnections between the diodes in two orthogonal directions X and Y which will be defined hereinafter.

It is known that the detecting diodes serve to obtain between their output terminals a current whose intensity is proportional to the quantity of electrons which strike their active faces and to their energy (for example in the case of electrons of 36 keV energy, the diode current will be $10^4$ times the current emitted by the photocathode).

Figure 3:
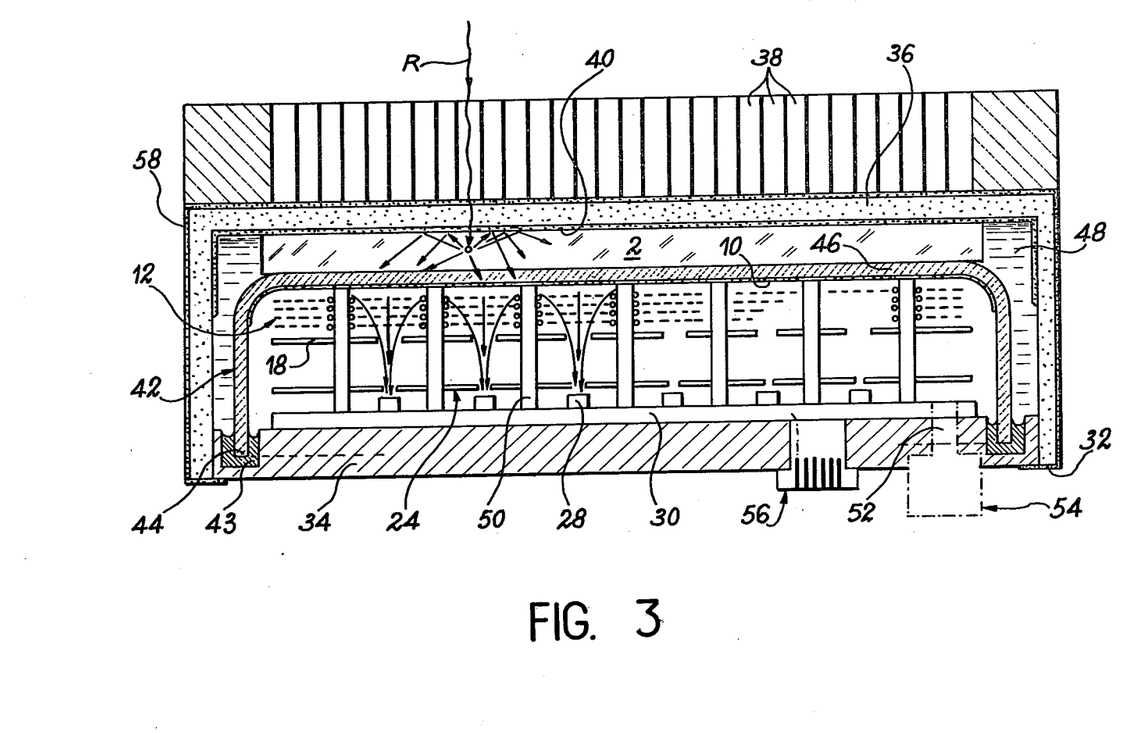
FIG. 3 is a vertical sectional view of a complete embodiment of the device.

One embodiment of the device in accordance with the invention is shown in greater detail in the vertical sectional view of FIG. 3. The device is housed within a first insulating casing 32 which is closed by the metallic base plate 34.

A collimator 38 of known type is placed in front of the entrance face 36 of the casing 32 which is naturally permeable to radiations.

The entrance face 36 of the casing 32 is coated internally with a metal deposit 40 which is brought to a potential of − 36 kV and coated externally with a metal deposit which is brought to the reference potential. The complete assembly of focusing channels and acceleration space is enclosed within a second casing in which a high vacuum is maintained. This casing is constituted by a glass bell-housing 42, the free edge 44 of which is rigidly fixed to the base plate 34 by means of a fusible joint 43 such as a tin-indium joint, for example.

The internal face of the entrance face 46 of the glass bell-housing which performs the same function as the glass plate 8 of FIG. 1 and is therefore in contact with the scintillator 2 is coated with a special layer 10 which forms the photocathode.

This photosensitive layer is also brought to a potential of − kV.

The space 48 formed between the casing 32 and the glass bell-housing 42 is filled with a liquid which provides electrical insulation and optical coupling.

A thin film of said liquid ensures optical coupling between the scintillator and the entrance face 46 of the glass bell-housing.

Reverting now to the description of FIG. 3, it is observed that the glass bell-housing rests on small columns such as column 50, the lower ends of which in turn rest on the interconnection support 30.

Said columns are formed of insulating material and also serve to secure the grids 12 and the plates 18 and 24 as will be explained in greater detail hereinafter. In fact, the fusible joints 43 clearly do not provide any rigid connection between the base plate 34 and the bell-housing 46 and serve only to ensure leak-tightness.

It should further be noted that the base plate 34 is provided with a duct 52 which establishes a connection between the interior of the bell-housing 46 and a gettering pump 54 in order to maintain a high vacuum within said bell-housing.

Futhermore, the base plate 34 is provided with a passage for electrical lead-out connections 56 for bringing the different internal elements of the bell-housing to a suitable potential and to collect the electric signals delivered by the detecting diodes.

It should be further noted that the edges 44 of the bell-housing 42 are coated with a metal deposit which permits wetting by the indium-tin alloy of the fusible joint, this wetting being necessary in order to ensure perfect leak-tightness.

Moreover, the external face of the insulating casing is also coated with a layer 58 which is formed by metallizing and connected to ground.

Figure 4:
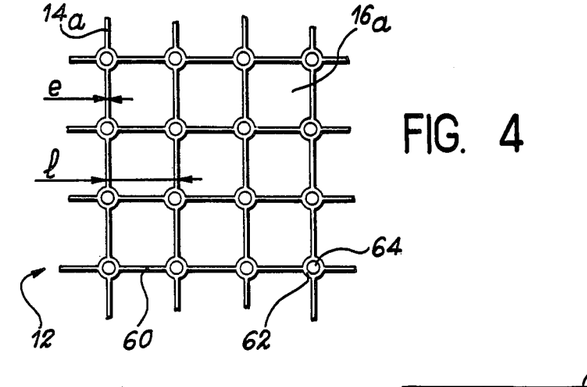
FIG. 4 is a top view of a focusing grid.

FIG. 4 shows one form of construction of a focusing grid such as the grid 12a, for example.

The grid is square and constituted by conductive segments such as the segment 60 for connecting nodes 62 in which are pierced holes 64 for mounting the grids on the small columns 50.

By way of example, the pitch $l$ of the grid meshes has a value of 15 mm and the thickness $e$ of the segments which constitute the grid is 0.5 mm.

It is apparent that the array of holes 14a, 14b and so forth which correspond to the different grids are in aligned relation and form a focusing channel 14 for the photoelectron beams.

Figure 5:
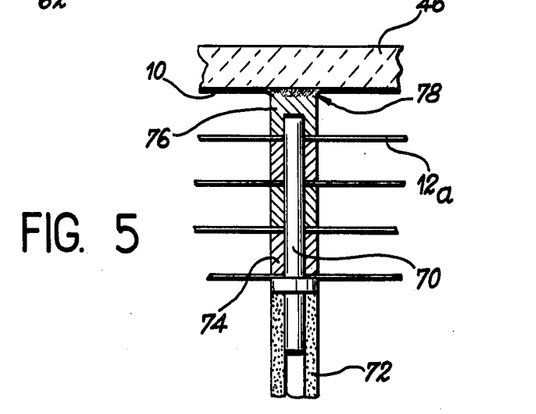
FIG. 5 is a vertical sectional view showing the method adopted for mounting the grids on the small columns.

FIG. 5 shows one method adopted for mounting the focusing grids on the columns in an example in which said grids are all brought to the same potential.

The grids are engaged by means of their holes 64 in a centering member 70 which is placed at the top end of an electrical insulating tube 72 constituting the small columns proper.

Conductive distance-pieces such as those designated by the reference 74 are interposed between two consecutive grids.

Above the top grid 12a, the distance-piece 76 is closed and its upper extremity 78 is compressible in order to balance mechanical stresses. The insulating portion 72 of each small column also serves to fix the grids 18 and 24 in position.

It is apparent that, in other examples in which it is desired to apply different potentials to the different grids, insulating materials will be employed for the fabrication of the columns.

Figure 6:
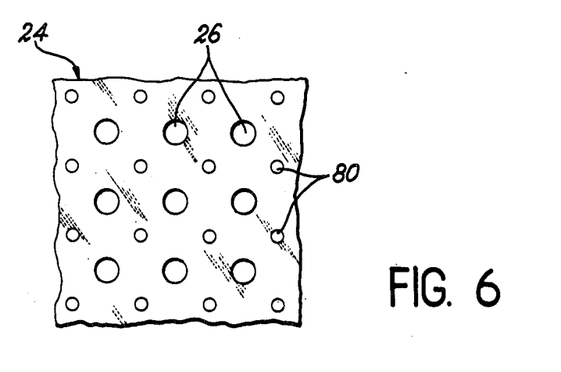
FIG. 6 is a top view of a screen grid.

In FIG. 6, there is shown a top view of the grid 24. This latter is provided with holes 80 for mounting the plate on the columns and with holes 26 as described earlier, the number of holes being clearly equal to the number of focusing channels 14, 16 and so forth.

In FIG. 7, there is shown an alternative form of construction of the beam-focusing means. In this alternative embodiment, the grids are replaced by an assembly of metallic partitions having substantially the same thickness in a direction at right angles to the photocathode as the assembly of the four grids.

The partitions aforesaid are constituted by metallic strips such as those designated by the reference 100, said strips being provided with slots 102 spaced at a distance $l$ which determines the width of the focusing channels.

Figure 7A:
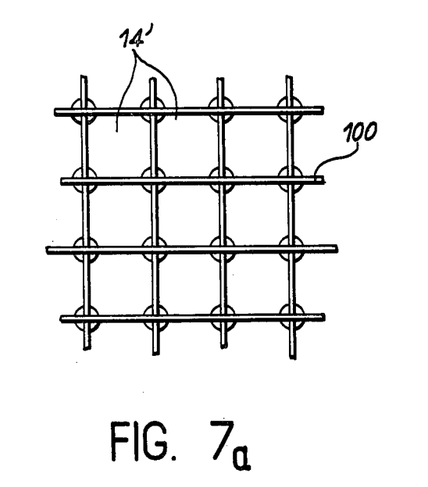
FIGS. 7a, 7b, 7c and 7d show one example of construction of the focusing partitions.
Figure 7B:
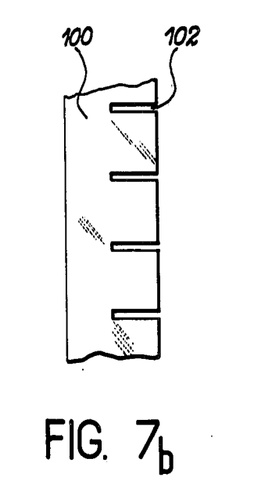
Figure 7C:
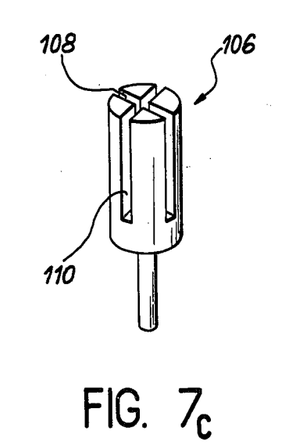
Figure 7D:
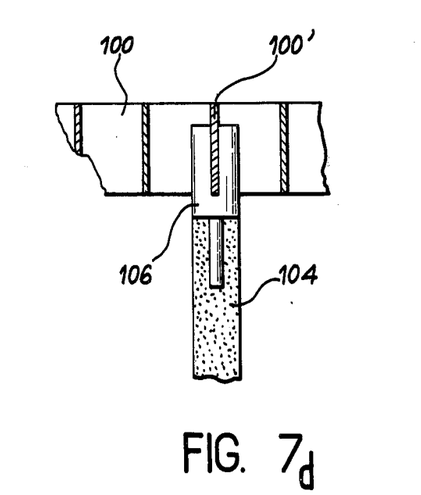

In order to reconstitute the assembly of partitions aforesaid, the different partitions are engaged within their slots as shown in the top view of FIG. 7a, in which it is observed that the different partitions define focusing channels 14′, 14″ in the same manner as the focusing grids.

In this case, the supporting columns are formed by insulating materials 104, there being fitted at the end of each column a metallic mounting stud 106 provided with two perpendicular slots 108 and 110. It can readily be understood with reference to FIGS. 7d that a conductive strip 100 is engaged in a slot 108, for example, whereas a conductive strip 100′ disposed at right angles is engaged in the slot 110.

As in the previous example, these sets of metallic partitions can replace the set of thin grids described in FIGS. 4 and 5; they can replace groups of successive thin grids or only one of these latter, depending on the desired electron-focusing characteristics.

Figure 8:
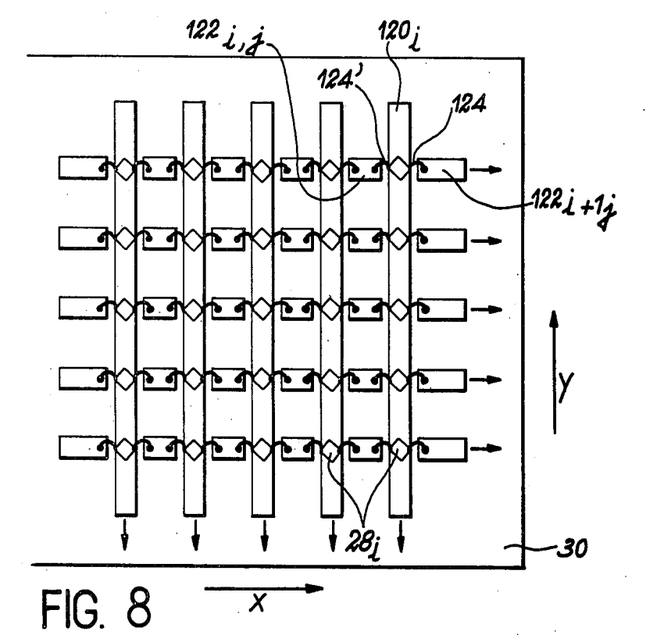
FIG. 8 is a view showing the connections between the detecting diodes.

In FIG. 8, there is shown one mode of connection of the diodes $28_i$ for effecting localizaton in two orthogonal directions X and Y. In order to form these two sets of connections, conductive strips $120_i$ which are parallel to the direction Y are deposited on the support 30; the diodes are fixed on the strips $120_i$ and connected electrically to these latter by means of their first terminals.

There are also deposited on the support 30 the strip elements $122_j$ for reconstituting strips which are parallel to the direction X. The second terminals of the diodes are connected by leads such as those designated by the references 124 and 124′ to the two adjacent portions of strips $122_{ij}$ and $122_{i+1j}$. The conductive strips formed in the two directions are connected to a processing circuit (not shown in the drawings).

Preference is given to the use of detecting diodes of the silicon type obtained by ion implantation and having the following characteristics:

N-type silicon substrate having a resistivity of 400 ohms,
detecting area of 3 mm$^2$,
gain at 36 kV equal to 10$^4$.

These diodes could be replaced by semiconductor devices having an inherent gain such as, for example, avalanche diodes or small integrated amplifying circuits.

Figure 9:
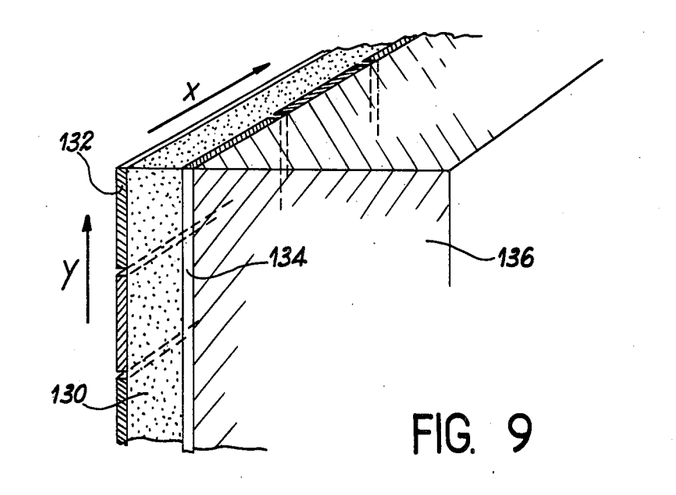
FIG. 9 is a view in perspective showing a first alternative embodiment of the localization assembly.

It would also be possible to replace the diodes by a single detection surface which extends over the entire surface 30 and is formed of amorphous or polycrystalline semiconductor material (see FIG. 9). Conductive strips 132 which are parallel to the direction X are deposited on one face of said plate 130 and conductive strips 134 which are parallel to the direction Y are deposited on the other face. Each intersection of a strip 132 with a strip 134 constitutes a detector which is sensitive to the electrons of a focusing channel. There is thus reconstituted a two-direction localizaton system. The complete assembly is fixed on a substrate 136 which is preferably formed of glass.

The optical efficiency of the device can be improved even further by employing photoemissive focusing partitions so as to utilize the 40 to 60% of photons which emerge from the photosensitive layer 10 deposited on the entrance window and which have not been converted to electrons by the photocathode 10. Similarly, instead of employing a flat entrance window as in the example described earlier, it would be possible to employ convex or concave entrance windows according to requirements.

In this case, the same shape will be given to the focusing and accelerating electrodes as well as to the detecting surface.

Figure 10:
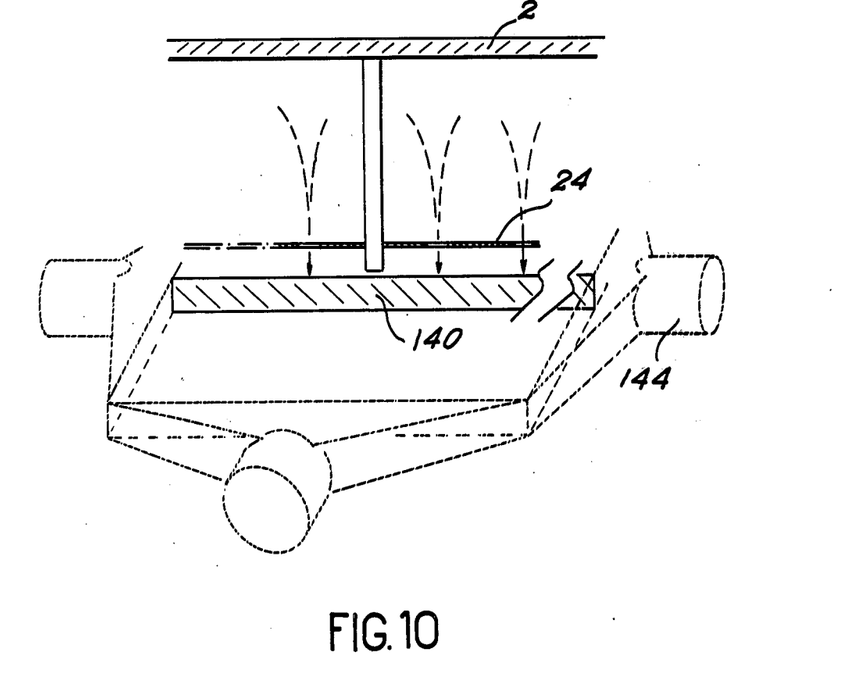
FIG. 10 is a view showing a second alternative embodiment of the localization assembly.

In an alternative embodiment shown in FIG. 10, the localization system constituted by the detecting diodes can be replaced by a system constituted by a second square scintillator 140 which replaces the support plate 30 and the base plate 34, said second scintillator being associated with four photomultipliers placed on the four edge faces and having characteristics such that said scintillator operates as a light guide (the efficiency being considerably increased in comparison with the systems employed in cameras for localization by means of four photomultipliers).

Finally, a further improvement in the sensitivity of the device can be achieved by making provision between the photocathode 10 and the focusing grids 12 or the focusing partitions 100 for devices of a type which is in any case well known and permit multiplication by secondary emission of electrons, of the electrons emitted by the photochathode.

The output signal would be multiplied to a corresonding extent.

A device in accordance with the invention for localizing radiation makes it possible to obtain excellent geometrical definition.

In fact, in the case of focusing grids or focusing partitions having a mesh of 15 mm, a resolution of 2 mm is obtained with a Na I (Tl) scintillator and γ-radiations of 140 keV energy.

Under the same conditions, the resolution is 1.5 mm in the case of a mesh size of 10 mm and is 0.75 mm in the case of a mesh size of 5 mm.

Moreover, said device makes it possible to obtain a high count rate. In fact, the duration of the output signal is equal to the fluorescence time of the scintillator.

Finally, high stability in time as well as good homogeneity between the cells are obtained. In fact, in this system, the gain is solely a function of the accelerating voltage and of the energy of production of electron-hole pairs in the silicon. The different focusing channels therefore have gains which are of very closely related value and very stable in time.

What I claim is:

1. A device for localizing radiations comprising:
    a photocathode means for converting said radiations to emitted photoelectrons;
    nonelectron multiplying means for focusing said emitted photoelectrons in the form of a number of separate beams, each of said beams corresponding to photoelectrons emitted by a well-localized fraction of said photocathode;
    means for accelerating photoelectrons of said beams; and
    means for detecting and localizing said beams of photoelectrons, said means including a plurality of electron-detecting amplifying semiconductor components disposed in a generally common plane, each of said semiconductor components being located in a line of extension of one of the longitudinal axes of said beams, said plane being generally parallel to said photocathode.

2. A device for localizing radiations according to claim 1, wherein said device includes a scintillator in front of said photocathode said scintillator being capable of converting said radiations to light phenomena.

3. A device according to claim 1, wherein said means for focusing said emitted phtotelectrons includes a plurality of identical flat grids in parallel spaced relation brought to stepped electric potentials, each grid being provided with a plurality of identical openings, said openings of said grids constituting focusing channels having axes at right angles to the planes of said grids, said device further including a first conductive plate, said grids being placed between said photocathode and said first conductive plate, said first conductive plate being pierced by holes each aligned with an axis of each channel, the axes of said channels being coincident with the longitudinal axes of said beams said first conductive plate being parallel with said grids, said first conductive plate being brought to a positive potential with respect to said photocathode.

4. A device according to claim 3, wherein at least one of said grids is constituted by flat partitions parallel to the axes of said beams, said partitions being such as to delimit focusing channels of identical cross-section.

5. A device according to claim 1, wherein said means for accelerating said photoelectrons includes a first conductive plate and a second conductive plate, said second conductive plate being at a positive potential with respect to said first conductive plate, said second plate being parallel to said first plate, said first and second plates having holes with axes coincident to the axes of said beams.

6. A device according to claim 5, wherein said holes of said second plate have a cross-sectional area which is substantially smaller than the cross-sectional area of said beams.

7. A device according to claim 1, wherein said semiconductor components have a predetermined active surface area the cross-sectional area of said holes of the second plate being substantially equal to said active surface area of said semiconductor components.

8. A device according to claim 1, wherein said semiconductor components are placed along the lines and the columns of a matrix, said semiconductor components of any one line being connected electrically to each other and said semiconductor components of any one column being connected electrically to each other.

9. A device according to claim 1, wherein said semiconductor components are diodes.

10. A device according to claim 1, wherein said localizing means includes an amorphous semiconducting plate provided on one face thereof with conductive strips disposed in a first direction and on the other face thereof with conductive strips disposed at right angles to said first direction.

11. A device according to claim 1, wherein said device is provided between said photocathode and said focusing means with means for multiplication of photoelectrons by secondary electron emission.

12. A device according to claim 1, wherein said device includes a base plate and a glass bell-housing enclosing said focusing and accelerating means, the photocathode being mounted on an internal wall of an entrance face of said bell-housing, said bell-housing being closed by a base plate on which said localizing means is fixed.

13. A device according to claim 12, including insulating columns supporting said bell-housing one end of said insulating columns contacting said bell-housing, the other end of said columns being fixed to said base plate, said columns securing said focusing means and said accelerating means.

14. A device according to claim 12, wherein said bell-housing is sealed to said base plate by means of a fusible joint.

15. A device for localizing radiations comprising:
 a photocathode means for converting said radiations to emitted photoelectrons;
 nonelectron multiplying means for focusing said emitted photoelectrons in the form of a number of separate beams, each of said beams corresponding to photoelectrons emitted by a well-localized fraction of said photocathode;
 means for accelerating photoelectrons of said beams; and
 means for detecting and localizing said beams of photoelectrons including a a scintillator placed behind said accelerating means, said scintillator acting as a light guide, said means for detecting and localizing further including four photomultipliers disposed at uniform intervals on the periphery of said scintillator.

* * * * *